L. H. LANGLAND.
COMBINATION ROLLING CUTTER AND SHOE FURROW OPENER FOR CORN PLANTERS.
APPLICATION FILED FEB. 14, 1921.
1,422,454.
Patented July 11, 1922.
2 SHEETS—SHEET 2.
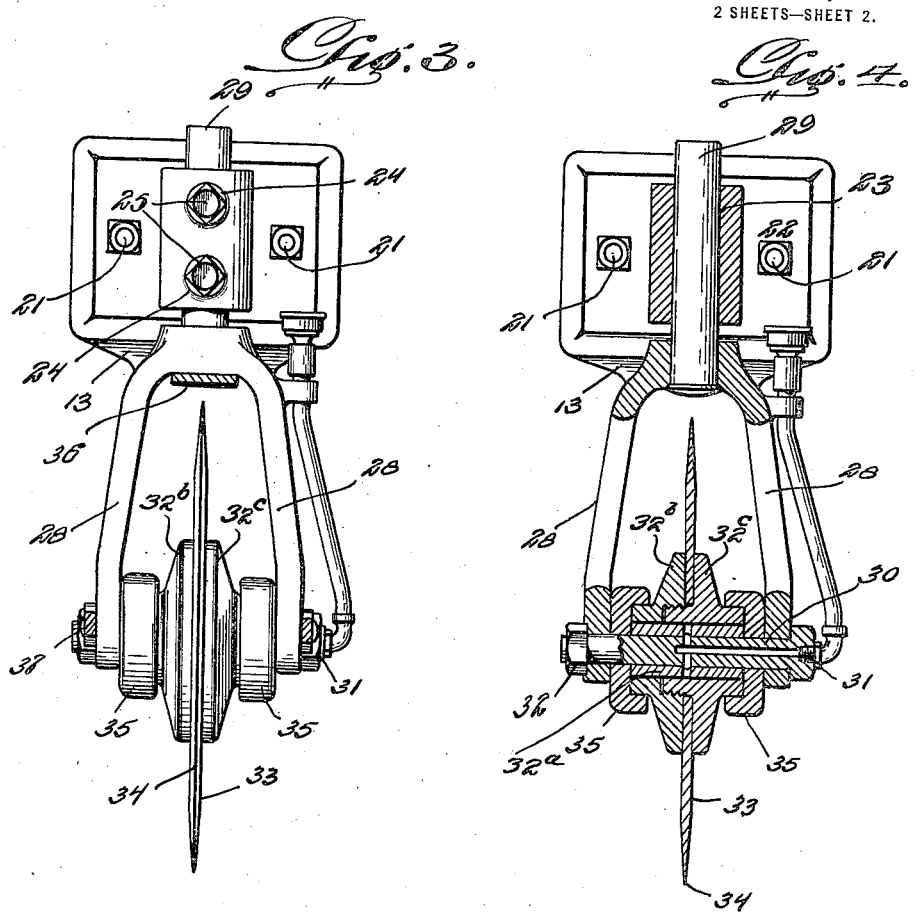
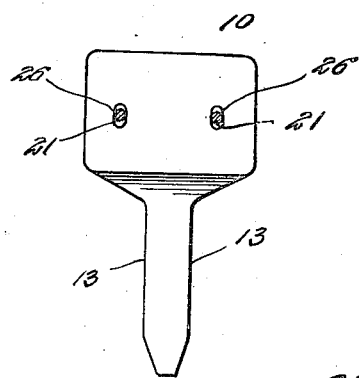
L. H. Langland.
INVENTOR
WITNESSES:
BY
ATTORNEY

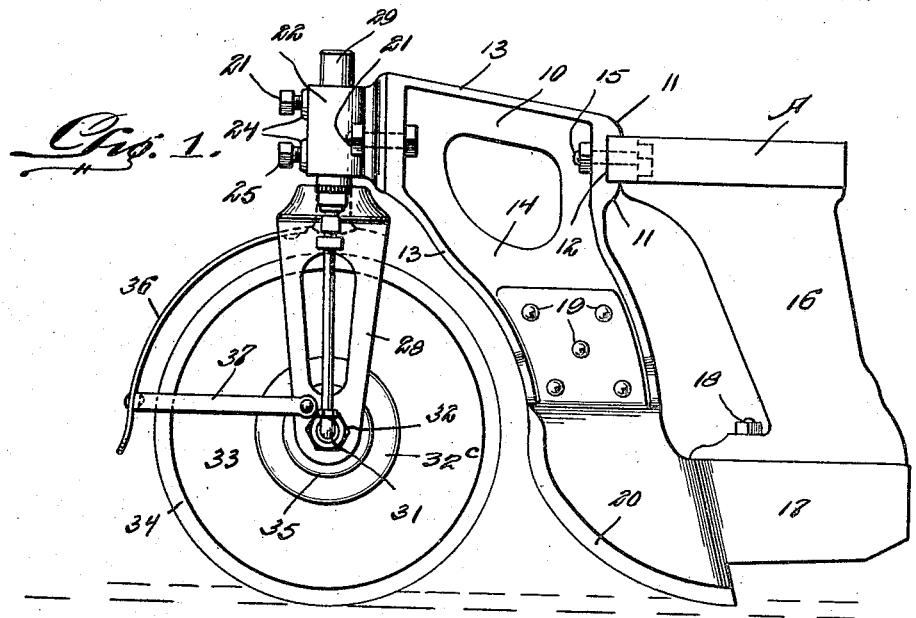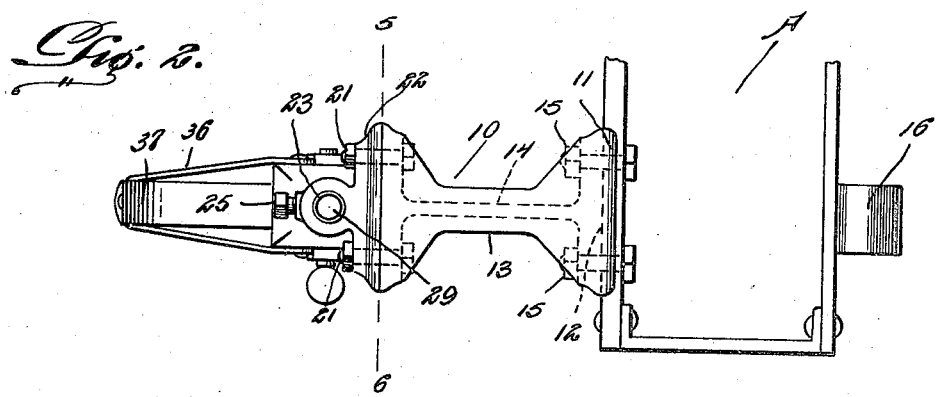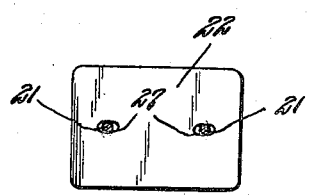

UNITED STATES PATENT OFFICE.

LAMMERT H. LANGLAND, OF WINDOM, MINNESOTA.

COMBINATION ROLLING CUTTER AND SHOE-FURROW OPENER FOR CORN PLANTERS.

1,422,454.   Specification of Letters Patent.   Patented July 11, 1922.

Application filed February 14, 1921. Serial No. 444,870.

*To all whom it may concern:*

Be it known that I, LAMMERT H. LANGLAND, a citizen of the United States, residing at Windom, in the county of Cottonwood and State of Minnesota, have invented new and useful Improvements in Combination Rolling Cutter and Shoe-Furrow Openers for Corn Planters, of which the following is a specification.

This invention relates to agricultural implements, particularly to corn planters, and has for its object the provision of a device including a planting shoe and a rolling and cutting disk mounted in advance thereof for the purpose of cutting straw, roots, rubbish of any kind, manure, or the like encountered by the device so as to prevent such matter from accumulating on the shoe and preventing closing of the furrow opened by the shoe, it being well known that sticking of such trash on the shoe drags the soil along and prevents it from filling into the furrow and covering the seed corn planted.

An important object is the provision of a device of this character in which the castings supporting the shoe and the cutter are relatively adjustable so that the cutter and shoe may be brought into exact alignment and it being furthermore a feature that the cutter is angularly adjustable or rather its shank is rotatably adjustable with respect to one of the casting elements so as to accomplish the same aligning result.

Another object is the provision of a device of this character in which the bearings for the cutter are protected by guards against clogging by dirt and in which a guard is provided for the front edge of the cutter.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawings in which—

Figure 1 is a side elevation of my device,

Figure 2 is a plan view,

Figure 3 is a front elevation,

Figure 4 is a vertical sectional view through the cutter and its mounting,

Figure 5 is a cross sectional view on the line 5—6 looking forwardly,

Figure 6 is a similar view on the line 5—6 looking rearwardly.

Referring more particularly to the drawings, the letter A designates the front frame of a planter which may be of any ordinary type. In carrying out my invention I provide a casting 10 which has its rear portion formed with overhanging shoulders 11 defining a recess 12 engaged upon the forward end of the frame A. Around all sides, except the extreme bottom, this casting is formed with a reinforcing flange 13 formed integrally upon the web 14 constituting the body of the casting. The casting 10 is secured to the frame A by means of suitable bolts 15 passing through the frame and through the adjacent flanges of the casting 10 at opposite sides of the web 14.

Secured to and depending from the frame A is a planter boot 16 to the lower end of which is secured the planter shoe 17 held associated with the boot by bolts 18. The upper portion of the shoe 17 is disposed against the web 14 of the casting 10 between the flanges at the lower portion thereof and is secured by means of rivets or bolts 19. This shoe differs materially from the ordinary well known shoe inasmuch as it is shorter and has a greater curvature, its front edge being curved, as shown, and sharpened or beveled, as indicated at 20, to faciliate its passage through the soil.

Secured to the forward extremity of the casting 10 by means of suitable bolts 21, is a casting 22 formed with a vertical cylindrical bore 23 and provided at its forward portion with threaded bosses 24 into which are screwed set screws 25. The bolts 21 pass through vertically elongated holes 26 in the forward portion of the casting 10 and also pass through laterally elongated holes 27 in the rear portion of the casting 22 and these elongated holes are for the purpose of effecting adjustment of the casting 22 with respect to the casing 10. It will be noted that the rear and front portions of the casting 10 and the rear portion of the casting 22 are laterally extended, as clearly shown so as to provide relatively large engaging surfaces so as to make a strong and substantial structure.

The numeral 28 designates a fork which carries a cylindrical shank 29 which is adjustable about a vertical axis and which is also slidably mounted within the bore 23 and held in adjusted position by the set screws 25. At the lower end of the fork 28 are provided bearings through which extends a bolt 31 carrying a clamping nut 32. This bolt is formed with a lubricating passage into which extends the lower end 31 of a tube carrying a grease cup. Rotatable upon this bearing is a sleeve $32^a$ upon which rotates a cutting disk 33 having the sharpened edge 34 adapted to cut the ground and any trash thereon in advance of the shoe 20. This disk is clamped between threadedly connected members $32^b$ and $32^c$ disposed upon the sleeve $32^a$. It is preferable that the adjustment of the shank 29 be such that this disk will penetrate the ground to a greater depth than the shoe 20 so that in the event that trash engaged by the disk is not cut it will be forced into the ground below the level reached by the shoe. The bearings are protected by suitable dust caps 35 which are for the purpose of excluding dirt and grit so that the bearings will not be impaired. Secured to the fork 28 is an arcuate strip 36 constituting a fender or guard for the disk and to the lower portion of this strip are secured arms 37 which are secured to the lower ends of the fork, as clearly shown.

From the foregoing description it is believed that the operation of the device will be thoroughly understood without any further detailed explanation and it will be noted that the device is a distinct improvement in efficiently preventing the accumulation of trash of any kind upon the shoe.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A corn planter attachment comprising in combination with a frame, a supporting member secured to the forward end of the frame, a boot depending from the frame, a shoe secured to the lower end of a boot and to the lower end of said support, a bearing member secured to the forward end of said support, a member having a cylindrical shank slidably and rotatably adjustable within said bearing frame, and a cutting disk journaled within said last named member.

2. A device of the character described comprising in combination with a planter frame, a boot depending from the frame, a supporting casting secured to the front of the frame and including a depending portion, a shoe secured to said depending portion and secured to the lower end of the boot, a bearing member secured to the forward end of said casting, a slidable and rotatable element carried by said bearing member, and a cutting disk journaled within said last named element.

In testimony whereof I affix my signature.

LAMMERT H. LANGLAND.